United States Patent [19]
Wood, Jr.

[11] Patent Number: 5,004,367
[45] Date of Patent: Apr. 2, 1991

[54] TURNBUCKLE ASSEMBLY

[75] Inventor: Ruey E. Wood, Jr., Mount Clemens, Mich.

[73] Assignee: TRW Inc., Lyndhurst, Ohio

[21] Appl. No.: 444,563

[22] Filed: Dec. 1, 1989

[51] Int. Cl.$^5$ .............................................. F16B 7/06
[52] U.S. Cl. ................................... 403/46; 403/308; 403/314; 280/95.1
[58] Field of Search ................... 403/46, 43, 47, 290, 403/370, 45, 314, 308, 300; 280/95.1

[56] References Cited
U.S. PATENT DOCUMENTS

| | | |
|---|---|---|
| 655,136 | 7/1900 | Vandegrift .......................... 403/314 |
| 731,635 | 6/1903 | Vandegrift et al. ................. 403/46 |
| 1,016,835 | 2/1912 | Maurice et al. . |
| 1,140,978 | 5/1915 | Hart ..................................... 403/308 |
| 2,696,397 | 12/1954 | Booth . |
| 2,703,723 | 3/1955 | Hess ..................................... 403/46 |
| 2,885,234 | 5/1959 | Larson . |
| 3,498,652 | 3/1970 | Cass ..................................... 403/43 |
| 4,172,676 | 10/1979 | DeChant .............................. 403/43 |
| 4,614,451 | 9/1986 | Braisted, Jr. ..................... 403/43 X |

FOREIGN PATENT DOCUMENTS 295718 4/1932 Italy ..................................... 403/46

Primary Examiner—Peter M. Cuomo
Attorney, Agent, or Firm—Tarolli, Sundheim & Covell

[57] ABSTRACT

A turnbuckle assembly for an automotive steering system tie-rod connection applies both radial and axial forces against the engaged threads to resist relaxation of tightening between the threads and to prevent spreading of the seam of a rolled stamped sleeve. Complimentary conical surfaces of a nut and the sleeve apply a compressive force as the nut is advanced axially onto the sleeve.

13 Claims, 2 Drawing Sheets

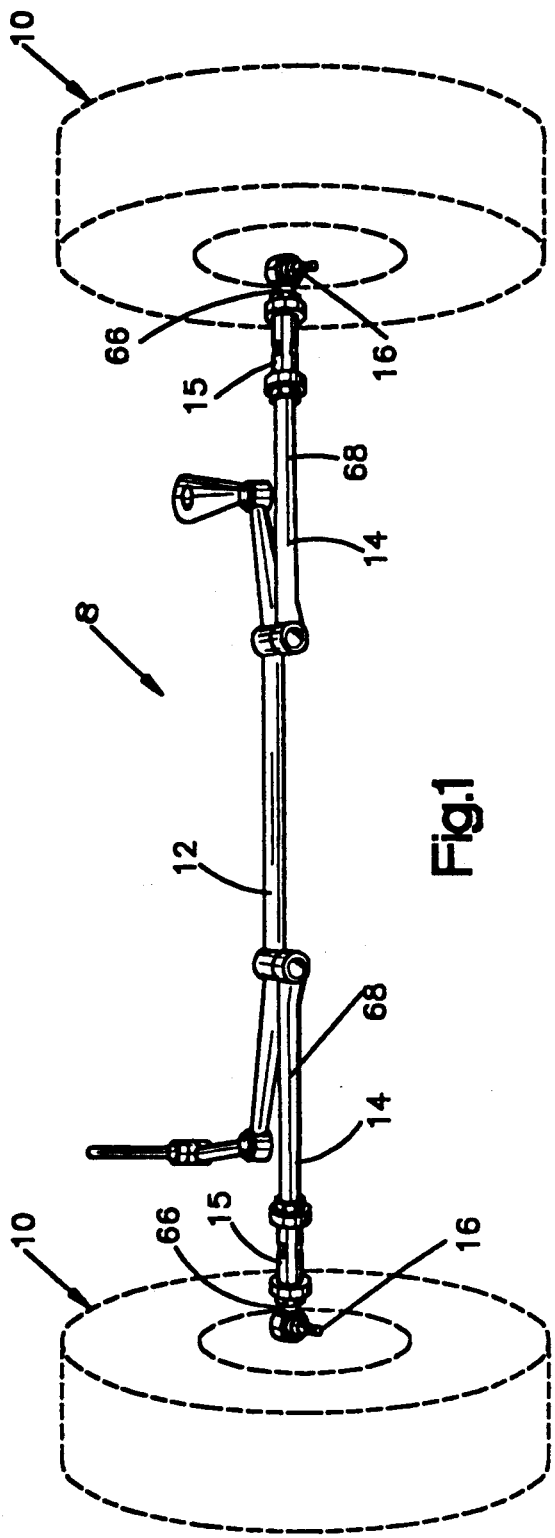
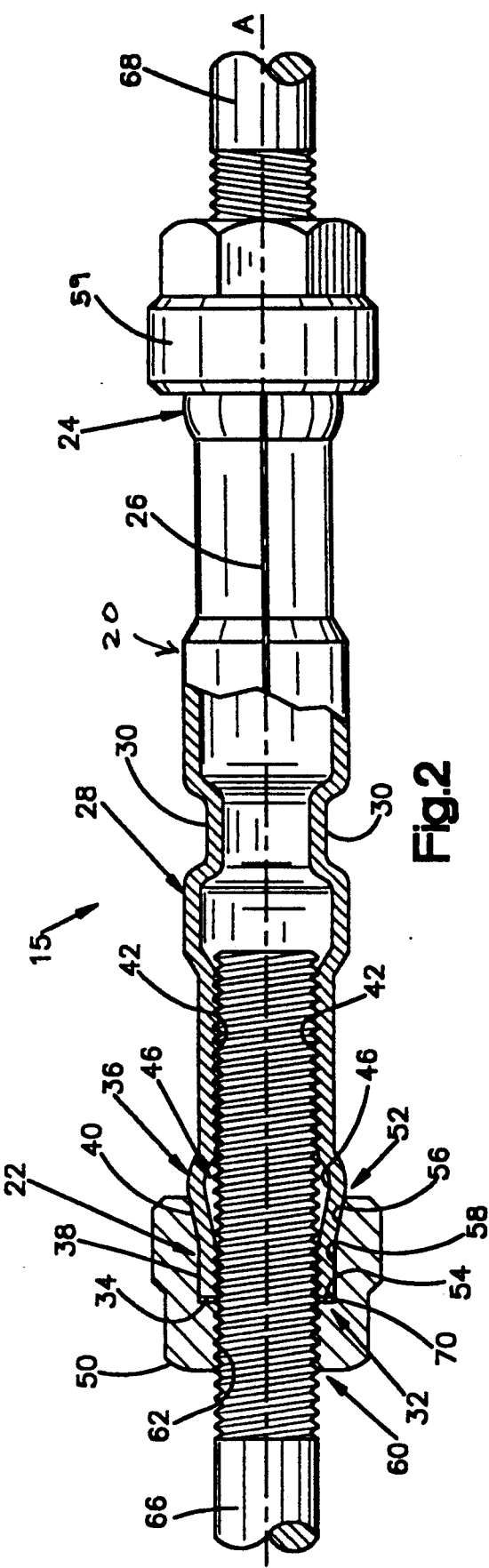

TURNBUCKLE ASSEMBLY

TECHNICAL BACKGROUND

The present invention is directed to the art of turnbuckles and is particularly directed to a turnbuckle locking arrangement.

BACKGROUND ART

Turnbuckle assemblies for establishing an adjustable axial connection between two coaxial rod members are well known in the art. Such assemblies typically include an internally threaded tubular sleeve. Each end of the sleeve has an internally threaded portion that receives an associated externally threaded rod member. One sleeve end and its associated rod have left hand threads. The other sleeve end and and its associated rod have right hand threads. As the sleeve is rotated, the rods are both screwed into or out of the sleeve depending on the direction of rotation of the sleeve. After the desired axial spacing between the two rods is achieved, a locking mechanism is used to lock the turnbuckle in place. Fasteners are applied to each end of the sleeve to force the internal sleeve threads tightly against the external rod threads and thereby hold the turnbuckle in place relative to the rods. Such fasteners include ring clamps tightened around the outside of the sleeve and jam nuts tightened axially against the ends of the sleeve.

U.S. Pat. No 2,696,397 discloses a turnbuckle assembly that includes a generally rectangular piece of metal rolled into a tubular sleeve having a longitudinally extending seam. Ring clamps are tightened around each end of the sleeve to compress the sleeve ends against the associated rod threads. Ring clamps are generally selected as the fastening members for rolled, seamed sleeves because a circumferentially extending ring clamp tends to hold the seam from being pulled open by external forces transmitted through the connected rod members, or by axial forces otherwise applied directly to the sleeve by jam nuts.

U.S. Pat. No. 2,885,234 disclosed a turnbuckle assembly that includes a slotted tubular sleeve and jam nuts threaded on the rod members. The jam nuts are tightened against the ends of the sleeve. The jam nuts each include a conical inner surface that contacts the outside edge of the associated sleeve end. The jam nuts lock the sleeve to resist opening of the sleeve ends when unusually heavy loads are applied thereto.

SUMMARY OF THE INVENTION

The present invention provides a turnbuckle assembly for establishing an adjustable axial connection between two rod members, and particularly for establishing an adjustable axial connection in applications calling for precise axial positioning such as in an automotive steering system.

In accordance with the present invention, there is provided a turnbuckle assembly comprising a sleeve having an axis, an end portion including an open end, and an inclined outer surface extending radially outwardly with respect to the axis in an axial direction away from the open end. A nut receivable coaxially over the end portion of the sleeve is provided with an inclined inner surface extending radially with respect to the axis to register with the inclined outer surface of the sleeve.

The invention thereby enables application of a radially compressive force between the sleeve and a rod member received therein, as the inclined surface of the nut is urged against the inclined surface of the sleeve to compress the sleeve radially as the nut is advance axially onto the end portion of the sleeve.

In accordance with another feature of the invention, the sleeve end and the nut are provided with complementary annular end surfaces. The nut has an intermediate assembled position received over the end portion of the sleeve with the inclined inner surface of the nut registered against the inclined outer surface of the sleeve, and with an open axial space between the complimentary annular end surfaces.

In accordance with a preferred embodiment of the invention, the inclined outer surface of the end portion of the sleeve and the inclined inner surface of the nut are provided as circumferentially extending frusto-conical surfaces. The inclined outer surface of the sleeve is spaced axially from the open end by a cylindrical outer surface, a threaded inner surface of the nut is spaced axially from the inclined inner surface thereof by a cylindrical inner surface, and the cylindrical inner surface of the nut is coaxially receivable over the cylindrical outer surface of the sleeve.

The invention thereby enables application of the radial force between the engaged inclined surfaces before the axial space is closed between the complimentary annular end surfaces as the nut advances onto the sleeve, and consequently before application of substantial axial anchoring forces between the two complimentary annular surfaces.

DESCRIPTION OF THE DRAWINGS

Other features and advantages of the invention will be apparent to those skilled in the art by reference to the following description of a preferred embodiment taken in connection with the accompanying drawings wherein:

FIG. 1 is a schematic representation of an automotive steering system including a turnbuckle assembly in accordance with the invention;

FIG. 2 is a side view, taken partly in section, of one turnbuckle assembly shown in FIG. 1.

DESCRIPTION OF A PREFERRED EMBODIMENT

Figure 3:
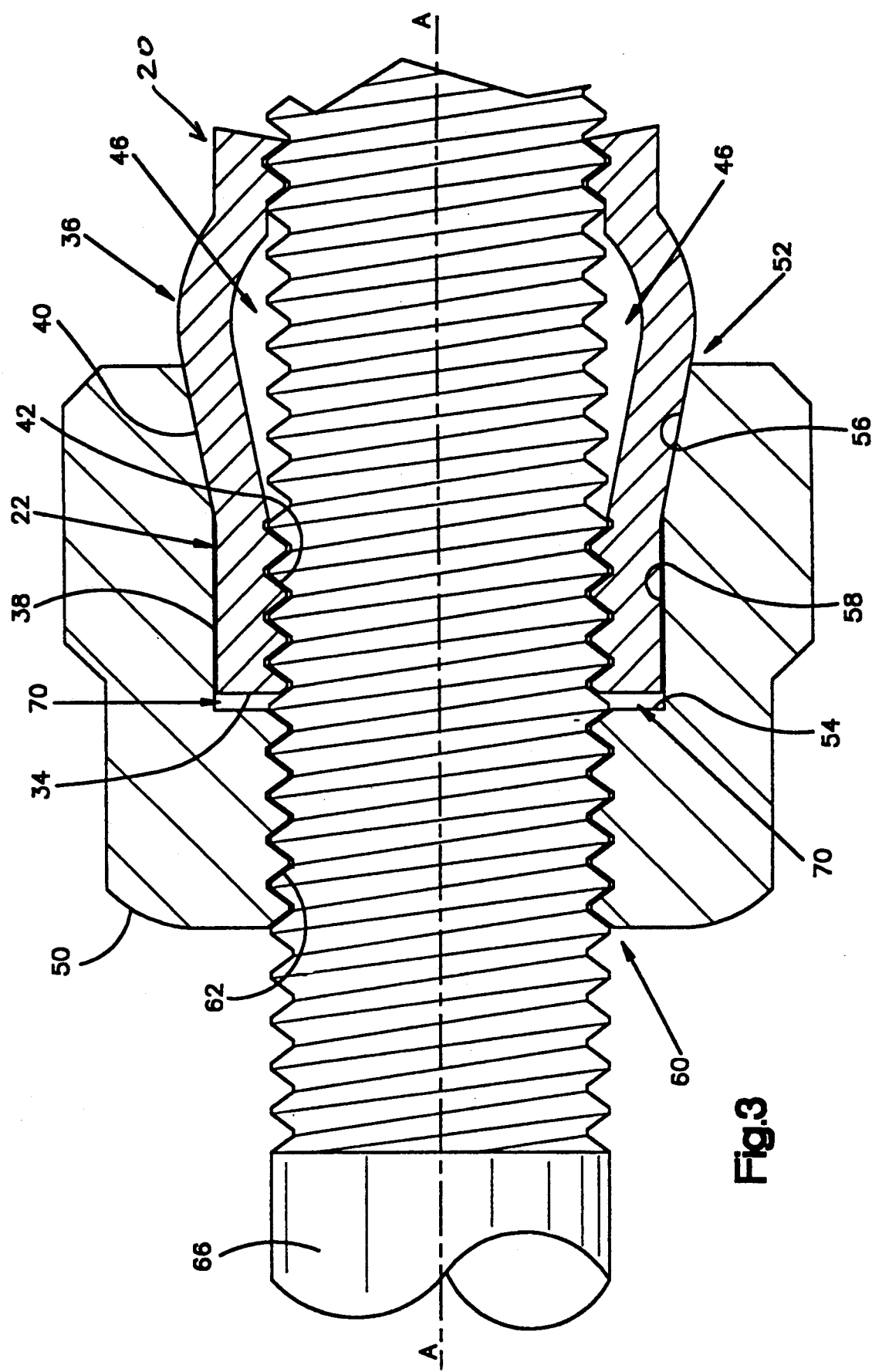
FIG. 3 is an enlarged partial view of the turnbuckle assembly shown in FIG. 2.

Referring to FIG. 1, a steering linkage 8 comprises a pair of steerable wheels 10. The steerable wheels 10 are connected to a center link 12 through a corresponding pair of tie-rods 14 and sockets 16. The sockets 16 are attached to the wheels in a manner well known in the art. Axial alignment of the steerable wheels 10 is accomplished by means of turnbuckle assemblies 15 associated with the tie-rods 14 in accordance with the present invention.

Referring to FIG. 2, a turnbuckle assembly 15, in accordance with a preferred embodiment of the invention, comprises a sleeve 20 having a first end portion 22 and a second end portion 24. The sleeve 20 is formed from a generally rectangular stamped metal blank rolled into tubular form having an axis A and a longitudinally extending seam 26 defined by adjoining edges of the metal blank. An enlarged central portion 28 of the sleeve 20 is provided with wrench flats 30. The wrench flats 30 provide a means for turning the sleeve 20.

The opposite end portions 22 and 24 are similarly formed, each including an open end 32, an annular end surface 34, and an enlarged clamping portion 36 spaced axially from the open end 32 by a cylindrical outer surface 38. The enlarged clamping portion 36 includes a frusto-conical outer surface 40 inclined with respect to the axis A to extend radially outwardly therefrom in a direction axially away from the open end 32.

The first and second end portions 22, 24 of the sleeve 20 are dissimilar only to the extent that the first end portion 22 has a first threaded inner surface 42 with threads extending in a first or right hand direction, and the second end portion 24 has a second threaded inner surface (not shown) with threads extending in an opposite or left hand direction with respect to the first threaded inner surface 42. Both the first inner surface 42 and the second threaded inner surface are interrupted by unthreaded regions 46 which are deformed radially outwardly upon formation of the enlarged clamping portions 36. However, those skilled in the art will appreciate that the enlarged clamping portions 36 could be formed alternately as protrusions on one side of the metal blank from which the sleeve 20 is formed, whereby the threaded inner surfaces would not be interrupted thereby.

A nut 50 includes a first open end 52 coaxially receivable over the first end portion 22 of the sleeve 20, and an annular inner surface 54 which is complimentary to the annular end surface 34 of the sleeve 20. The nut 50 further includes an inclined inner surface 56 having a frusto-conical configuration complimentary to the configuration of the inclined outer surface 40 of the sleeve 20 to register in surface contact therewith as shown in FIGS. 2-3.

A cylindrical inner surface 58 of the nut 50 spaces the inclined inner surface 56 axially from the annular inner surface 54, and is coaxially receivable over the cylindrical outer surface 38 of the sleeve 20. The nut 50 further includes a second open end 60 and a threaded inner surface 62 extending from the second open end 60 axially to the annular inner surface 54. The threaded inner surface 60 has threads which are complimentary to the threads at the first threaded inner surface 42 of the sleeve 20 to extend in the same direction therewith when the nut 50 is received over the sleeve 20. A second nut 59 is formed to be likewise engaged with the second end portion 24 of the sleeve 20.

The turnbuckle assembly 15 serves as an adjuster to fix the effective axial length of a tie-rod 14 as shown in FIG. 1 by controlling the axial spacing between oppositely threaded first and second sections 66 and 68 of the tie-rod 14 as shown in FIG. 2. When the tie-rod sections 66 and 68 are threaded into the sleeve 20 to establish the desired axial relationship therebetween, the nuts 50, 59 carried on the tie-rod sections are advanced axially onto the respective sleeve end portions 22, 24 to tighten the turnbuckle assembly 15 into a closed position.

With specific reference to the first end of the turnbuckle assembly 15, as shown in FIG. 2, the first nut 50 is advanced axially onto the first end portion 22 of the sleeve 20 into an intermediate assembled position with the inclined inner and outer surfaces thereof registered in surface contact. In this intermediate assembled position, an axially open space 70 exists between the complimentary annular surfaces 34 and 54. Further advancement of the nut 50 axially onto the sleeve 20 causes the inclined inner surface 56 of the nut 50 to press radially inwardly against the inclined outer surface 38 of the sleeve 20 whereby a compressive force is exerted radially between the first threaded inner surface 42 of the sleeve 20 and the engaged threads of the first tie-rod section 66. This compressive force is applied along a portion of the turnbuckle assembly 15 extending from the first open end 22 of the sleeve 20 axially to the enlarged clamping portion 36.

Still further advancement of the nut 50 axially onto the sleeve 20 brings the nut into a final assembled position with the annular inner surface 54 thereof abutting against the annular end surface 34 of the sleeve 20. Tightening of the nut 50 into the final assembled position develops a substantial axial and rotational anchoring forces between the engaged threads and the abutting annular surfaces. These anchoring forces, as well as external forces applied to the tie rod 14, urge the tie rod section 66 to shift axially out of its original assembled position in the sleeve 20. Such forces also tend to separate the edges of the sleeve seam 26. However, the compressive force previously applied by means of the engaged inclined surfaces 40 and 56 serves to clamp the tie rod section 66 from being shifted out of its desired axial position, and also serves to hold the seam 26 closed. The original assembled position of the tie rod section 66 is thereby maintained in accordance with the invention.

With more specific reference to use of the invention for alignment of steerable wheels in a vehicle steering linkage 8 as shown in FIG. 1, a turnbuckle assembly 15 to be adjusted is loosened by loosening the nuts 50 and 59. Rotating the sleeve 20 in one direction moves the oppositely threaded rod sections 66 and 68 axially apart; rotating the sleeve 20 in an opposite direction moves the rod sections 66, 68 axially closer together. The sleeve 20 is rotated to provide an axial spacing of the rod members 66, 68 which provides a desired effective length of the tie rod 14 to align the steerable wheel 10. The nuts are then tightened as described above. The invention prevents the rod members 66 and 68 and the sleeve 20 from being shifted out of their desired positions by first applying a radial clamping force to hold the engaged sleeve and rod threads together before the anchoring forces of the tightened nuts are applied. The clamping force also holds the threaded components together against creep through any dimensional tolerance or clearance between the engaged threads.

From the above description of a preferred embodiment of the invention, those skilled in the art will perceive improvements, changes and modifications. Such improvements, changes and modifications within the skill of the art are intended to be covered by the appended claims.

I claim:

1. A turnbuckle assembly comprising:
a sleeve having a sleeve axis and an end portion, said end portion including an open end, an outer spacing surface, and an inclined outer surface spaced axially from said open end by said outer spacing surface, said inclined outer surface extending radially outwardly with respect to said sleeve axis in an axial direction away from said open end; and
a nut having a nut axis, nut threads, an open end receivable coaxially onto said end portion of said sleeve, an inner spacing surface receivable over said outer spacing surface of said sleeve, and an inclined inner surface spaced axially from said nut threads by said inner spacing surface, said inclined inner surface extending radially with respect to said nut axis to operatively register in surface contact with said inclined outer surface of said sleeve.

2. A turnbuckle assembly as defined in claim 1 wherein said inclined outer surface and said inclined inner surface are circumferentially extending frusto-conical surfaces.

3. A turnbuckle assembly as defined in claim 2 further comprising a rod member receivable in said open end of said sleeve and having external threads, said nut threads being engagable with said external threads for axial movement of said nut on said rod member upon rotation of said nut.

4. A turnbuckle assembly as defined in claim 1 wherein said inner and outer spacing surfaces are cylindrical surfaces.

5. A turnbuckle assembly as defined in claim 1 wherein said sleeve is a metal blank rolled into a tubular form and having a longitudinally extending seam defined by adjoining edges of said metal blank, said inclined outer surface of said sleeve being defined by a section of said sleeve which is radially enlarged relative to said outer spacing surface and which is spaced axially from said open end, said sleeve having an inner surface with threads extending on axially opposite sides of said radially enlarged section of said sleeve.

6. A turnbuckle assembly as defined in claim 5 wherein said inner surface of said sleeve has an unthreaded region extending axially across said radially enlarged section of said sleeve.

7. A turnbuckle assembly as defined in claim 6 wherein said sleeve has a uniform wall thickness axially across said radially enlarged section.

8. A turnbuckle assembly comprising:
a sleeve having a sleeve axis and an end portion, said end portion including an annular end surface, an outer spacing surface, and an inclined outer surface spaced axially from said annular end surface by said outer spacing surface, said inclined outer surface extending radially outwardly with respect to said sleeve axis in an axial direction away from said annular end surface;
a nut having a nut axis, an open end receivable coaxially onto said end portion of said sleeve, a threaded inner surface, an annular inner surface complementary to said annular end surface on said sleeve, an inner spacing surface, and an inclined inner surface spaced axially from said annular inner surface by said inner spacing surface, said inclined inner surface being complementary to said inclined outer surface on said sleeve; and
said nut having an intermediate assembled position received coaxially onto said end portion of said sleeve wherein said inner spacing surface is received over said outer spacing surface, said inclined inner surface is registered in surface contact with said inclined outer surface, and said annular inner surface is spaced axially from said annular end surface.

9. A turnbuckle assembly as defined in claim 8 wherein said inner and outer spacing surfaces are cylindrical surfaces.

10. A turnbuckle assembly as defined in claim 9 further including a rod member receivable in said open end of said sleeve and having external threads, said threaded inner surface of said nut being engagable with external threads for axial movement of said nut on said rod member.

11. A turnbuckle assembly as defined in claim 8 wherein said nut is movable axially from said intermediate assembled position to a final assembled position wherein said annular inner surface on said nut is in abutting contact with said annular end surface on said sleeve to develop an axial force between said annular surfaces, movement of said nut from said intermediate assembled position to said final assembled position developing a radially compressive force between said registered inclined surfaces before said annular surfaces contact one another.

12. In a vehicle steering linkage including a steerable wheel and a tie rod assembly for controlling alignment of said steerable wheel, said tie rod assembly including a pair of tie rod section having threaded ends and an adjuster for controlling coaxial spacing of said tie rod sections, the improvement comprising:
said adjustor comprising an internally threaded sleeve having an axis and opposite end portions having open ends for receiving said threaded ends of said tie rod sections, each of said end portions having an outer ramp surface inclined at an associated angle with respect to said axis, each of said outer ramp surfaces being spaced from its associated open end of said sleeve to provide an axial section of said sleeve between each ramp surface and its associated open end; and,
a pair of nuts each having threads for axial movement of said nuts with respect to said open ends of said sleeve and each nut having a portion receivable onto an associated open end of said sleeve, said portion including an inner spacing surface receivable over its associated axial section of said sleeve, and an inner ramp surface spaced from said nut threads by said inner spacing surface, each of said inner ramp surfaces being inclined with respect to said axis at an angle complementary to the ramp angle of its associate sleeve end.

13. An adjustable tie rod for an automotive vehicle, said tie rod comprising:
a first rod member including a first end portion having left hand, external threads and a second end portion having a socket attachment means;
a second rod member including a first end portion having right hand, external threads and a second end portion having a socket attachment means;
a tubular sleeve having a first end portion with an open end and internal threads to receive said first externally threaded end portion of said first rod member and a second end portion with internal threads to receive said first externally threaded end portion of said second rod member so that rotation of said sleeve in one direction screws both said first and second rod member further into said sleeve to thereby shorten the length of said tie rod and rotation of said sleeve in an opposite direction screws both said first and second rod members further out of said sleeve to thereby extend the length of said tie rod, each end portion of said sleeve having an external conical ramp surface portion spaced a finite distance from its associated open end; and
locking nuts, each end portion of said tubular sleeve having an associated locking nut, each locking nut including an internal threaded portion for screwing said nut axially with respect to said sleeve, each nut further including an internal ramp portion spaced from the internal threaded portion a distance equal to or greater than said finite distance, said internal ramp portions being sloped so as to mate with its associated external conical ramp surface portions of said sleeve so that tightening of one of said nuts against said sleeve effects a radially inward force component that tightens the associated sleeve end portion against its associated rod member thereby locking the length of said tie rod.

* * * * *